United States Patent
Raison et al.

(10) Patent No.: US 9,435,224 B2
(45) Date of Patent: Sep. 6, 2016

(54) METHOD FOR COOLING A THERMAL PROTECTION FLOOR OF AN AFT AERODYNAMIC FAIRING OF A STRUCTURE FOR MOUNTING AN AIRCRAFT PROPULSION SYSTEM

(75) Inventors: Fabien Raison, Plaisance du Touch (FR); Emmanuelle Dumont, Toulouse (FR)

(73) Assignee: AIRBUS OPERATIONS S.A.S., Toulouse (FR)

(*) Notice: Subject to any disclaimer, the term of this patent is extended or adjusted under 35 U.S.C. 154(b) by 1037 days.

(21) Appl. No.: 13/542,880

(22) Filed: Jul. 6, 2012

(65) Prior Publication Data

US 2013/0174572 A1    Jul. 11, 2013

(30) Foreign Application Priority Data

Jul. 7, 2011  (FR) ...................... 11 56174

(51) Int. Cl.
*F01D 25/14* (2006.01)
*B64C 7/02* (2006.01)
(Continued)

(52) U.S. Cl.
CPC ............... *F01D 25/14* (2013.01); *B64C 7/02* (2013.01); *B64D 29/00* (2013.01); *B64D 33/04* (2013.01);
(Continued)

(58) Field of Classification Search
CPC ........ F01D 25/08; F01D 25/12; F01D 25/14; F01D 25/145; F02K 1/822; B64D 33/04; B64D 29/06; F02C 7/12; F02C 7/14; F02C 7/141; F02C 7/16; F02C 7/18; F02C 7/20; F05D 2260/20

USPC ................ 60/782, 797, 806, 39.83
See application file for complete search history.

(56) References Cited

U.S. PATENT DOCUMENTS

| | | |
|---|---|---|
| 5,203,163 A | 4/1993 | Parsons |
| 8,474,750 B2 | 7/2013 | Marche et al. |

(Continued)

FOREIGN PATENT DOCUMENTS

| | | |
|---|---|---|
| EP | 0 743 435 A1 | 11/1996 |
| EP | 1 004 759 A2 | 5/2000 |

(Continued)

OTHER PUBLICATIONS

U.S. Appl. No. 13/845,660, filed Mar. 18, 2013, Raison et al.

(Continued)

*Primary Examiner* — Thomas Denion
*Assistant Examiner* — Mickey France
(74) *Attorney, Agent, or Firm* — Oblon, McClelland, Maier & Neustadt, L.L.P.

(57) ABSTRACT

A propulsion system for an aircraft, including a dual-flow turbojet and a mounting structure for mounting this turbojet on the wing surface or on the fuselage of an aircraft. The mounting structure includes an aft aerodynamic fairing including a thermal protection floor to protect the mounting structure from the heat of a primary airstream channelled by an exhaust nozzle of the turbojet, as well as an air inlet provided in a longitudinal aerodynamic wall washed by a secondary airstream of the turbojet and delimiting together with an other similar wall a cavity isolated from the secondary airstream for extracting a cooling airstream from the secondary airstream, and air circulation means fed by the air inlet and having at least one outlet aperture emerging in a space between the thermal protection floor and the exhaust nozzle.

8 Claims, 4 Drawing Sheets

(51) Int. Cl.
*B64D 29/00* (2006.01)
*F02K 1/34* (2006.01)
*F02K 1/82* (2006.01)
*F02C 7/20* (2006.01)
*B64D 33/04* (2006.01)

(52) U.S. Cl.
CPC ............... *B64D 33/06* (2013.01); *F02C 7/20* (2013.01); *F02K 1/822* (2013.01); *F05D 2260/20* (2013.01); *Y02T 50/676* (2013.01)

(56) References Cited

U.S. PATENT DOCUMENTS

| | | |
|---|---|---|
| 8,517,305 B2 | 8/2013 | Marche et al. |
| 2007/0245739 A1 | 10/2007 | Stretton et al. |
| 2008/0202847 A1 | 8/2008 | Porte |
| 2008/0224018 A1* | 9/2008 | Lafont .................. B64D 27/26 248/554 |
| 2008/0245926 A1 | 10/2008 | Journade et al. |
| 2009/0148275 A1* | 6/2009 | Bogue .................. F01D 11/005 415/170.1 |
| 2010/0170220 A1 | 7/2010 | Kohlenberg |
| 2011/0155847 A1* | 6/2011 | Journade ............... B64D 29/02 244/54 |
| 2011/0290935 A1 | 12/2011 | Machado et al. |
| 2011/0290936 A1 | 12/2011 | Machado et al. |
| 2012/0001019 A1* | 1/2012 | Morvant ............... B64D 29/02 244/54 |

FOREIGN PATENT DOCUMENTS

| | | |
|---|---|---|
| EP | 2 190 739 | 6/2010 |
| GB | 2 302 371 A | 1/1997 |
| WO | WO 2009/037267 A1 | 3/2009 |

OTHER PUBLICATIONS

Preliminary Search Report issued Feb. 28, 2012 in French Application No. 1156174 (With English Translation of Category of Cited Documents).

* cited by examiner

METHOD FOR COOLING A THERMAL PROTECTION FLOOR OF AN AFT AERODYNAMIC FAIRING OF A STRUCTURE FOR MOUNTING AN AIRCRAFT PROPULSION SYSTEM

TECHNICAL FIELD

The present invention relates to the field of aircraft engine mounting structures, and more specifically relates to the thermal protection of a mounting structure for a dual-flow turbojet.

Generally speaking, a mounting structure, also called an Engine Mounting Structure (EMS), allows an engine to be suspended beneath the wing surface of an aircraft, or allows this engine to be mounted above this same wing surface or, again, allows this engine to be mounted in the aft portion of the aircraft's fuselage.

STATE OF THE PRIOR ART

Such a mounting structure is designed to form the connecting interface between an engine and a wing surface of the aircraft. It enables the forces generated by its associated engine to be transmitted to the structure of this aircraft, and also allows the routing of fuel, electrical, hydraulic and air systems between the engine and the aircraft.

To transmit the forces the mounting structure includes a rigid structure, also called the primary structure, often of the "box" type, i.e. formed by the assembly of upper and lower spars and of side panels connected to one another through transverse stiffening ribs.

Secondly, the mounting structure is fitted with mounting means interposed between the engine and the rigid structure. These mounting means generally include two engine attachments, and a device to transmit the thrust forces generated by the engine. In the prior art this transmission device habitually includes two lateral connecting rods connected firstly to an aft part of the fan casing of the engine, and secondly to an aft attachment attached to the central casing of the engine.

In the same way, the mounting structure also includes another series of attachments constituting a mounting system interposed between the rigid structure and the wing surface of the aircraft. This system habitually consists of two or three attachments.

In addition, the structure is fitted with multiple secondary structures allowing the systems to be segregated and held in position, whilst supporting aerodynamic fairing elements, and where the latter generally take the form of assemblies of panels added on to the structures. In a manner known to the skilled man in the art, the secondary structures are differentiated from the rigid structure in that they are not intended to transfer forces originating from the engine which must be transmitted to the wing surface of the aircraft.

The secondary structures include the lower aft pylon fairing, also called the APF, which has multiple functions, one of which is to form a thermal or anti-fire barrier, and another is to provide aerodynamic continuity between the engine outlet and the mounting structure. The fairing has a lower position when the engine is intended to be positioned under the wing, and has a higher position when the engine is intended to be positioned above the wing. An example of a fairing known from the prior art is disclosed in the European patent application EP 2 190 739°A1.

This aft aerodynamic fairing generally takes the form of a box including two side panels attached to one another by transverse internal stiffening ribs spaced relative to one another in a longitudinal direction of the fairing, and a thermal protection floor.

The side panels of the aft aerodynamic fairing are designed to be closely followed externally by a secondary airstream of the engine, due to their positioning in the engine's annular secondary airstream channel and/or at the outlet from this channel.

The thermal protection floor has an external face designed to be closely followed by a primary airstream of the engine, consisting of exhaust gases which may reach temperatures of the order of 540° C.; and these temperatures are indeed tending to increase with the recent developments of the technology used in turbojets.

This increase of temperature of the primary airstream poses many problems, notably with regard to thermal resistance and thermal expansion of the materials forming the thermal protection floor, and also to the noise of the jet, which tends to be intensified as a consequence.

In addition, a front end portion of the thermal protection floor is habitually positioned perpendicular to, and at a relatively small distance from, the external face of an exhaust nozzle of the turbojet, the internal face of which is closely followed by the relatively hot primary airstream, whereas the external face is washed by the relatively cold secondary airstream of the turbojet.

However, the region of this nozzle which is located facing the abovementioned front end portion of the thermal protection floor is not washed, or is washed relatively little, by the secondary airstream, and is therefore at a substantially higher temperature than the remainder of the nozzle. In addition, this hottest region of the nozzle tends to heat by radiation the front end portion of the thermal protection floor, such that the latter can reach temperatures substantially higher than the remainder of this floor.

This phenomenon is particularly pronounced when the aft aerodynamic fairing of the mounting structure extends as an extension of a bifurcation, i.e. from a region isolated from the secondary airstream into which extends a portion of the rigid structure of the mounting structure, and some of the means by which the engine is mounted on this rigid structure, given that such a bifurcation forms an obstacle to the penetration of the secondary airstream in the relatively thin space between the thermal protection floor and the exhaust nozzle.

DESCRIPTION OF THE INVENTION

One aim of the invention is notably to provide a simple, economic and efficient solution to these problems, allowing at least some of the abovementioned disadvantages to be avoided.

To this end it proposes a propulsion system for an aircraft having a dual-flow turbojet and a mounting structure intended to mount this turbojet on the wing surface or on the fuselage of an aircraft, where the said mounting structure includes an aft aerodynamic fairing including a thermal protection floor to protect the said mounting structure from the heat of a primary airstream originating from an exhaust nozzle of the said turbojet.

According to the invention, the propulsion system includes means for extracting a cooling airstream from a secondary airstream of the turbojet, together with air circulation means such as an air circulator fed by the said extraction means, and having at least one outlet aperture emerging in a space between the thermal protection floor and the exhaust nozzle.

The invention thus allows a portion of the secondary airstream, forming the said cooling airstream, to be injected into the relatively thin space between the thermal protection floor and the exhaust nozzle.

Since this space is delimited by the hottest portions of the thermal protection floor, firstly, and of the exhaust nozzle, secondly, the invention thus enables the temperature to be homogenised within both these elements, and therefore enables their lifetimes to be increased substantially.

In a preferred embodiment of the invention, the said extraction means include at least one air inlet connected to the said air circulation means, and formed in an aerodynamic wall of the propulsion system, where this wall is closely followed by the secondary airstream during operation.

Such an air inlet allows air to be extracted, whilst limiting the disturbance of the secondary airstream.

To this end, the air inlet is advantageously an aerodynamic inlet, in particular of the type known by the acronym NACA.

In addition, the aerodynamic wall in question here can be any wall washed by the secondary airstream, such as, for example, an internal or external nacelle case, and this wall is preferably a wall extending longitudinally opposite another similar aerodynamic wall of the said propulsion system, with which it delimits a cavity which is essentially isolated from the said secondary airstream.

In particular, in the preferred embodiment of the invention, the said aerodynamic walls are bifurcation walls mutually connecting two annular nacelle cases which delimit, respectively internally and externally, an annular space for the said secondary airstream to flow in the said turbojet.

In this case, the abovementioned aerodynamic walls form a bifurcation within the flow space of the secondary airstream, and the cavity defined between these two walls enables, in a known manner, the passage from a front portion of a rigid structure of the mounting structure which supports means for mounting the turbojet.

As a variant, the said aerodynamic walls can be side walls of the aft aerodynamic fairing.

In this case, the cavity defined between these walls constitutes the internal space of this fairing.

In all cases, the said extraction means advantageously include two air inlets formed respectively in the abovementioned longitudinal aerodynamic walls extending facing one another.

Generally speaking, the said air circulation means such as the air circulator preferably include at least one pipe extending at least partly in the abovementioned cavity.

Such a pipe allows the cooling airstream to be channelled efficiently.

In addition, the fact that this pipe is housed in the said isolated cavity of the secondary airstream optimally prevents the disturbance of this secondary airstream.

Furthermore, the abovementioned outlet aperture of the said air circulation means preferably emerges in the area of a front end of the said space between the thermal protection floor and the exhaust nozzle.

In this case the outlet aperture of the said air circulation means advantageously has an air ejection axis which is essentially parallel to a front end portion of the thermal protection floor.

The cooling air can thus be injected into this space in a direction aligned towards the rear essentially tangential to the thermal protection floor, and thus wash optimally the respective portions of the thermal protection floor and of the exhaust nozzle which delimit the said space.

In addition, when the cooling airstream speed is sufficiently great this airstream can form a relatively cool film of air along the thermal protection floor, beyond the rear end of the exhaust nozzle, and thus become inserted between a portion of this floor and the primary airstream so as to protect this portion of the floor from the heat of this primary airstream.

As a variant, the outlet aperture of the said air circulation means can traverse the thermal protection floor.

In this case, the cooling air can be injected into the said space by passing through the thermal protection floor, and be spread along the exhaust nozzle in the said space in an essentially centrifugal manner from the abovementioned outlet aperture.

Generally speaking, the propulsion system according to the invention preferably includes side sealing joints which laterally delimit the said space between the thermal protection floor and the exhaust nozzle.

The use of such joints is known to limit the risks of hot air from the turbojet's primary airstream rising into the space between the abovementioned floor and nozzle.

However, in the context of the invention, these joints have an additional advantage, in that they enable the cooling air diffused by the said air circulation means to be channelled within the abovementioned space, and therefore to improve the effectiveness of the cooling of the respective portions of the thermal protection floor, and of the exhaust nozzle, which delimit this space.

The invention also relates to an aircraft including at least one propulsion system of the type described above.

The invention also relates to a method of cooling a thermal protection floor of an aft aerodynamic fairing of a structure for mounting a propulsion system of the type described above, in which the cooling air is extracted from the secondary airstream of the turbojet of this propulsion system by the said extraction means, and is injected into the said space between the thermal protection floor and the exhaust nozzle of the turbojet by the said air circulation means.

This method has, naturally, the same advantages as those mentioned above concerning the propulsion system itself.

In addition, in this method the cooling air is preferably injected into the said space in a direction essentially parallel to the said thermal protection floor so as to form a cooling film of air between the said thermal protection floor and the said primary airstream of the turbojet.

The advantage of such a film of air has also been explained above.

BRIEF DESCRIPTION OF THE DRAWINGS

The invention will be better understood, and other details, advantages and characteristics of it will appear, on reading the following description given as a non-restrictive example, and with reference to the appended illustrations, in which.

In all these FIGS., identical references can designate identical or comparable elements.

DETAILED ACCOUNT OF PREFERRED EMBODIMENTS

Figure 1:
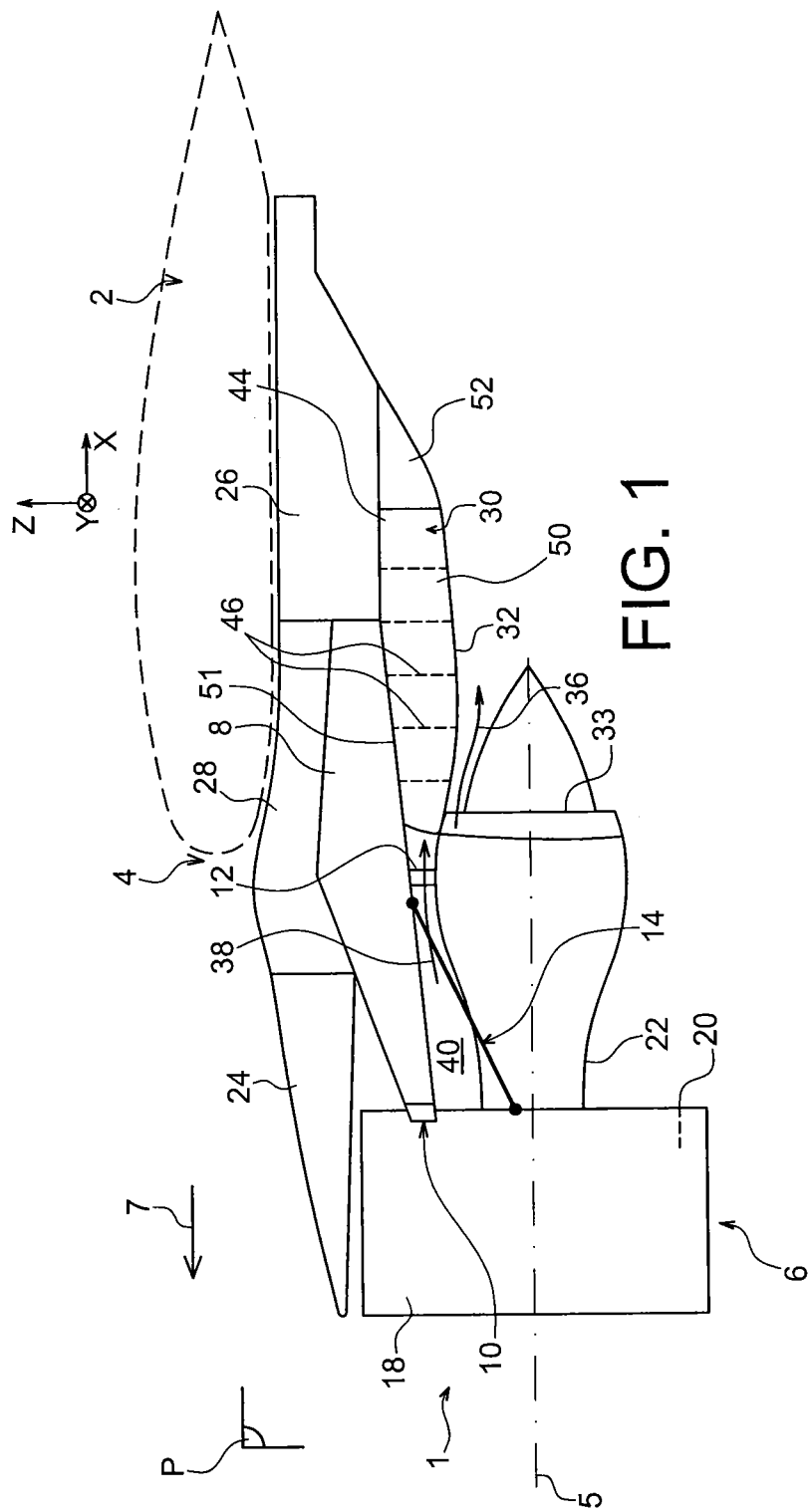
FIGS. 1 and 2 are partial schematic side views of a propulsion system for an aircraft according to a first preferred embodiment of the present invention.

With reference to FIG. 1, a propulsion system 1 for an aircraft according to a first preferred embodiment of the present invention can be seen, intended to be attached under a wing 2 of this aircraft, where this propulsion system 1 includes a mounting structure 4 and a dual-flow turbojet 6 mounted under this mounting structure 4.

Globally, mounting structure 4 includes a rigid structure 8, also called a primary structure, which supports mounting means for mounting engine 6, where these mounting means include multiple engine attachments 10, 12, together with a device 14 for transmission of the thrust forces 14 generated by engine 6.

Mounting structure 4 includes another series of attachments (not represented) added on to rigid structure 8 and allowing this propulsion system 1 to be suspended under wing surface 2 of the aircraft.

In addition, propulsion system 1 is intended to be surrounded by a nacelle (not represented).

In the remainder of the following description, by convention, X refers to the longitudinal direction of mounting structure 4 which is also comparable to the longitudinal direction of turbojet 6 and to that of the lower aft aerodynamic fairing which will be presented below, and where this direction X is parallel to a longitudinal axis 5 of this turbojet 6. Further, Y refers to the direction aligned transversely relative to device 4 and also comparable to the transverse direction of turbojet 6 and to that of the lower aft aerodynamic fairing, and Z to the vertical direction or the height, and where these three directions X, Y and Z are mutually orthogonal.

In addition, the terms "front" and "aft" must be considered relative to the forward direction of the aircraft during operation of turbojet 6, and this direction is represented schematically by arrow 7.

In FIG. 1 the both engine attachments 10 and 12, thrust forces transmission device 14, rigid structure 8 of mounting structure 4, and multiple secondary structures added on to rigid structure 8, can therefore be seen. These secondary structures segregating the systems and holding them in position, whilst supporting the elements of the aerodynamic fairing, will be described below.

As can be seen, turbojet 6 has at the front a large fan casing 18 delimiting an annular bypass duct 20, and includes towards the aft a smaller central casing 22, enclosing the core of this turbojet. Casings 18 and 22 are of course securely connected to one another.

As can be seen in FIG. 1, mounting structure 4 has two engine attachments 10 and 12, called respectively the front engine attachment and the aft engine attachment.

Rigid structure 8 takes the form of a box extending from aft to front, essentially in direction X, having transverse ribs (not represented), each of which has the shape of a rectangle aligned in a plane YZ.

The mounting means firstly include front engine attachment 10 interposed between a front end of rigid structure 8, also called a pyramid, and an upper portion of fan case 18. Front engine attachment 10 is designed in a conventional manner known to the skilled man in the art.

Secondly, aft engine attachment 12, which is also produced in a conventional manner known to the skilled man in the art, is for its part interposed between rigid structure 8 and central casing 22.

Again with reference to FIG. 1, the secondary structures of mounting structure 4 include a front aerodynamic structure 24, an aft aerodynamic structure 26, a fairing 28 connecting the front and aft aerodynamic structures, and a lower aft aerodynamic fairing 30.

Overall, these secondary structures are conventional elements identical or similar to those found in the prior art, and known to the skilled man in the art.

More specifically, front aerodynamic structure 24 is positioned as a lower front extension of wing surface 2 and above primary structure 8. It is assembled securely on rigid structure 8, and has an aerodynamic profile between an upper portion of fan access door assemblies connected to this front aerodynamic structure 24, and the leading edge of the wing surface. This front aerodynamic structure 24 then has not only an aerodynamic fairing function, but it also allows the positioning, segregation and routing of the various systems (air, electrics, hydraulics and fuel). In addition, since the front part of this structure 24 is not in contact with rigid structure 8, it is habitually interposed between a heat exchanger in the space defined between these two elements.

As a direct aft extension of this structure 24, again under the wing surface and assembled above rigid structure 8, is the "connecting fairing" 28, also called the "karman". After this, again in the aft direction, karman 28 is extended by aft aerodynamic structure 26, called the "Rear Secondary Structure" or RSS, which contains some of the mounting structure's fittings. This structure 26 is preferably located fully to aft of rigid structure 8, and is therefore attached under the aircraft's wing surface.

Finally, under rigid structure 8 and aft aerodynamic structure 26 is lower aft aerodynamic fairing 30, also called the "shield" or "Aft Pylon Fairing". Its essential functions are the formation of a thermal barrier, also called the anti-fire barrier, used to protect the mounting structure and the wing surface from the heat released by the primary airstream, and the formation of an aerodynamic continuity between the engine outlet and the mounting structure.

In a manner known to the skilled man of the art, above-mentioned lower aft aerodynamic fairing 30 includes a thermal protection floor 32 fitted with an outer surface intended to be closely followed by a primary airstream of the engine which this protection floor partially and radially delimits towards the outside, where this primary airstream, represented schematically by the arrow 36, is expelled from a nozzle 33 of the engine.

In addition, fairing 30 also includes two side panels 44 which, for their part, are designed to be closely followed externally by a secondary airstream of the engine represented schematically by arrow 38, due to their positioning in annular channel 40 of the engine's secondary airstream (FIG. 1) and/or at the outlet of the latter. Fairing 30 thus takes the form of a box including an internal cavity 41 (FIG. 4).

It should be noted that in the preferred embodiments described here, in which turbojet 6 is intended to be suspended under the wing surface of the aircraft, thermal protection floor 32 of the mounting structure and of the wing surface with regard to primary airstream 36 constitutes a lower portion of fairing 30, whereas a closing spar 51, opposite floor 32, constitutes an upper portion of this fairing 30 (FIG. 1). Naturally, the situation of both these elements 32, 51 would be reversed in the alternative case in which the turbojet is intended to be installed above the wing surface. Furthermore, it should be noted that in this alternative case covered by the present invention, fairing 30 would become an upper aft aerodynamic fairing.

Figure 2:
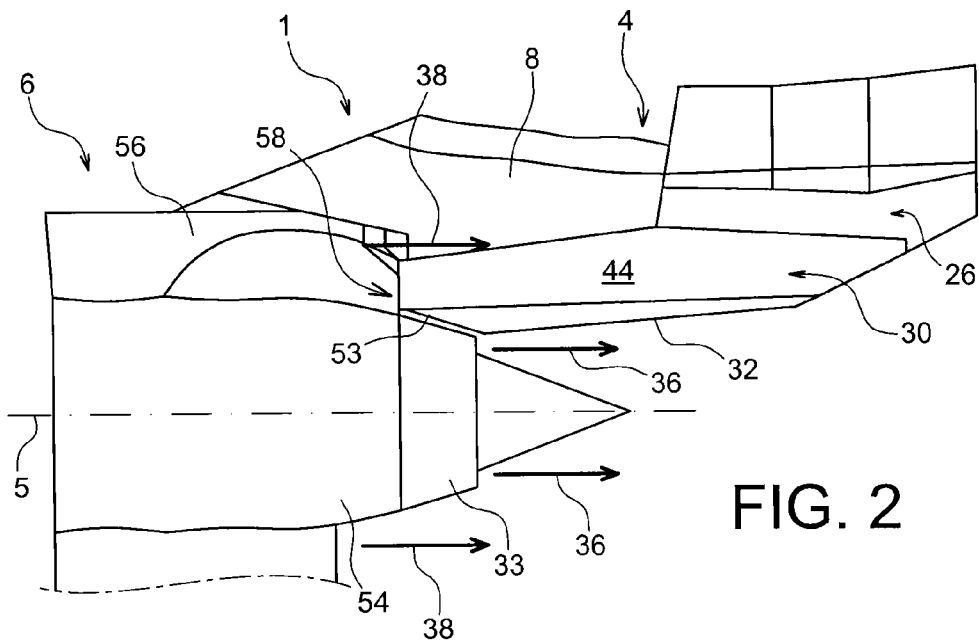
Figure 4:
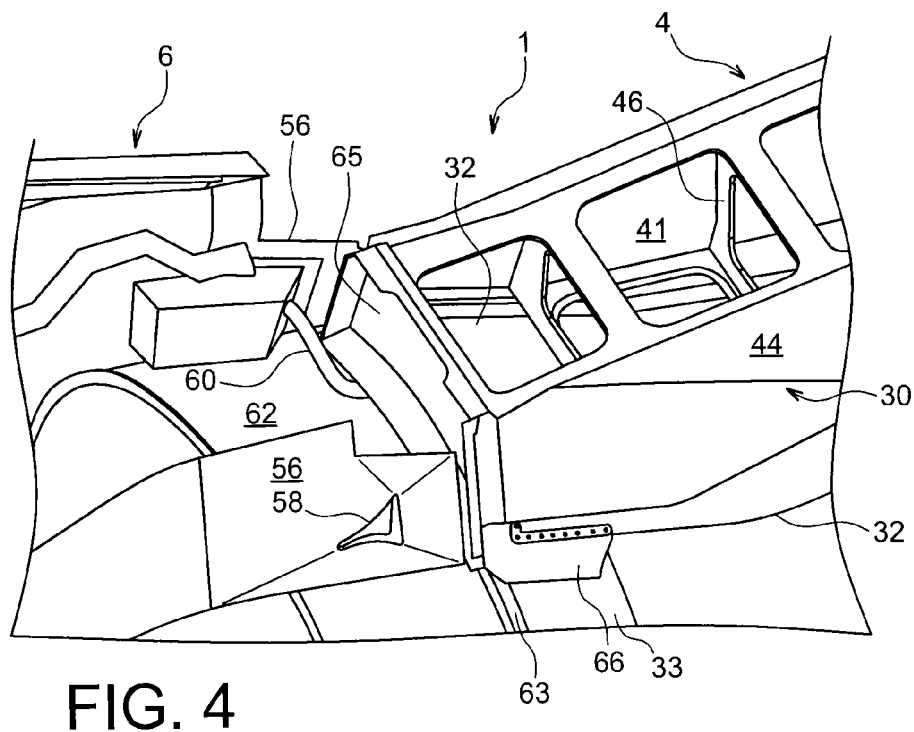

Finally, as can be seen in FIG. 2, a front end portion 53 of floor 32 is made to extend opposite, and at a small distance from, an upper end of nozzle 33 (FIG. 4). The clearance between this floor 32 and nozzle 33 defines a space 55 between these two elements, and is notably designed to take account of the deformations of the turbojet inherent to its different operating phases.

Again in a known manner, lower aft aerodynamic fairing 30, which has a general box shape, is assembled on aft aerodynamic structure 26 and rigid structure 8 (FIG. 1). Fairing 30 preferably has a plane of symmetry P corresponding to an XZ plane, where this plane P also constitutes a vertical plane of symmetry for entire mounting structure 4, and for engine 6.

Both side panels 44 of fairing 30 are essentially aligned in a plane XZ and positioned either side of plane P. They are attached to one another by stiffening transverse internal ribs 46, spaced relative to one another in direction X, where each of these ribs 46 is aligned in a plane YZ, and is for example rectangular or square in shape.

Side panels 44 are assembled securely and directly on the side portions of each of internal ribs 46, using conventional means known to the skilled man in the art.

In addition, fairing 30 incorporates thermal protection floor 32 in the lower portion of the box, the upper portion being closed by closing spar 51 opposite floor 32. Alternatively, the upper portion of the box may have no closing spars, and be sealed only by elements 8, 26, which are directly adjacent in direction Z.

Again with reference to FIG. 1, it can be seen that fairing 30 is divided into two separate portions which are fixed securely to one another, namely a front portion 50 constituting the majority of the fairing, for example 60 to 85% of it in terms of length along direction X, and a smaller aft portion 52, which has the overall shape of a pyramid or point, the base of which is rigidly attached to front portion 50, and the apex of which constitutes a rear end of fairing 30. As an indication, front portion 50 has a transverse section which is essentially uniform along its entire length.

Side panels 44 and closing spar 51 preferably each extend as single parts from one end to the other of fairing 30, i.e. at once along front portion 50, and along aft portion 52. Conversely, for its part, thermal protection floor 32 preferably extends as a single part only over front portion 50, and not over aft portion 52, although this could naturally be envisaged, without going beyond the scope of the invention. This feature is explained notably by the fact that pyramid-shaped aft portion 52 gradually departs from the axis of the engine, such that the primary airstream, which in any event loses heat intensity as it travels aft, causes a lesser thermal impact on the lower closure element of pyramid 52.

The fact that each of the elements mentioned above is designed as a single part does not rule out the possibility of manufacturing them using several separate portions attached securely on to one another, such as for example several portions in succession in direction X. This is also the case for the following elements which will be described as being likely to be manufactured as single parts.

FIG. 2 represents a rear portion of propulsion system 1, including an internal portion of the nacelle of this assembly 1, where this internal portion includes an inner fan structure 54, sometimes called an IFS, intended to delimit internally secondary airstream channel 40, together with two longitudinal walls 56, only one of which is visible in FIG. 2, which are connected to inner structure 54, and intended to guide secondary airstream 38 around certain portions of mounting structure 4 which traverse secondary airstream channel 40, such as a front portion of rigid structure 8 and engine attachments 10 and 12. To this end, longitudinal walls 56 of the nacelle delimit a cavity 62 (FIG. 4) which is essentially isolated from the secondary airstream in which these elements of mounting structure 4 extend, and which is commonly called a "bifurcation". In what follows, each longitudinal wall 56 will thus be called a "bifurcation wall".

Figure 5:
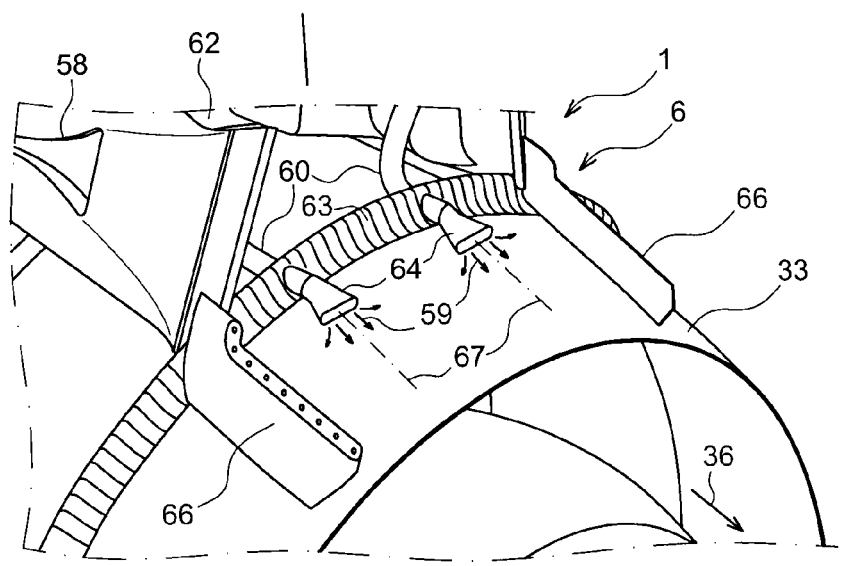

In the first preferred embodiment of the invention, each bifurcation wall 56 includes an air inlet 58 (FIGS. 2 to 5), intended to extract a proportion of the turbojet's secondary airstream to form a cooling airstream 59 (FIG. 5).

Air inlet 58 (FIG. 3) is preferably an aerodynamic air inlet with a configuration of the NACA type, but as a variant it can be of any type, and possibly have means forming a scoop which protrudes into the secondary airstream.

Each air inlet 58 is connected in airtight fashion to a corresponding air circulation pipe 60 (FIG. 4) fitted inside cavity 62 delimited by bifurcation walls 56, and emerging in abovementioned space 55, close to the front end of exhaust nozzle 33.

Figure 6:
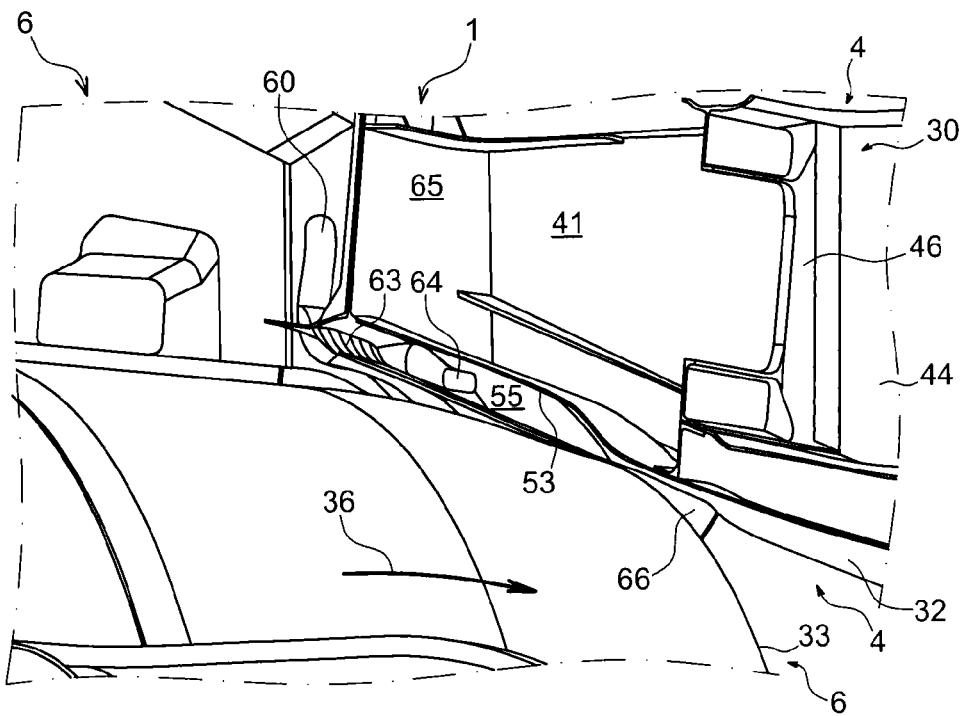

More specifically, each pipe 60 has an air ejection nozzle 64 (FIGS. 5 and 6) positioned near the front end of nozzle 33, directed towards the aft, and ejection axis 67 of which is essentially parallel to front end portion 53 of thermal protection floor 32. Each ejection nozzle 64 thus allows the diffusion of a cooling airstream 65 in a manner essentially tangential to floor 32.

In the example represented in these FIGS., each pipe 60 passes through a thermal or anti-fire protective annular joint 63, which is for example a spline joint of the type commonly called a finger seal (FIGS. 5 and 6), and which connects in essentially airtight fashion the respective upstream ends of nozzle 33 and of thermal protection floor 32. To this end, respective passage spaces may be included for pipes 60, where each of these spaces is positioned between two consecutive tabs of joint 63 (FIG. 5).

In addition, in this example, nozzles 64 of both pipes 60 are fitted essentially symmetrically relative to vertical plane of symmetry P of the propulsion system.

In addition, FIG. 4 shows that pipes 60 pass between nozzle 33 and the lower edge of an essentially vertical separating wall 65 between cavity 62 delimited by bifurcation walls 56 and internal cavity 41 of aft aerodynamic fairing 30.

Figure 3:
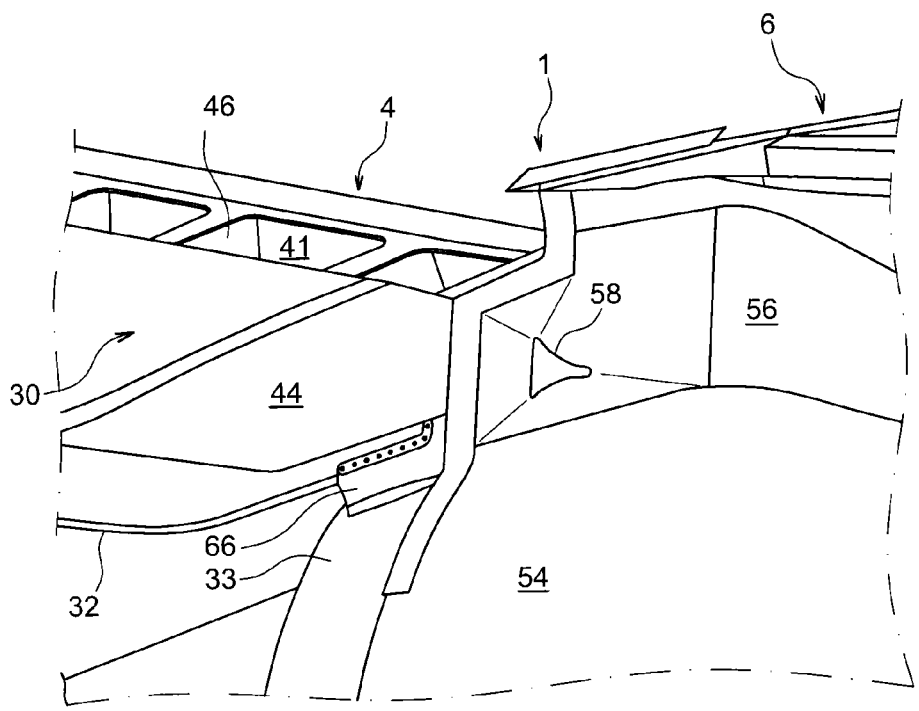
FIGS. 3 to 6 are partial perspective schematic views of the propulsion system of FIG. 1.

Furthermore, as can be seen in FIGS. 3 to 5, flexible side joints 66 are attached to each of side panels 44 of aft aerodynamic fairing 30 by their upper ends, such that their lower end comes into contact with exhaust nozzle 33.

These side joints 66 allow, in a known manner, the risks of hot air from the primary airstream rising into space 55 between front end portion 53 of floor 32 and nozzle 33 to be limited.

In the context of the invention, side joints 66 also enable the cooling airstream from pipes 60 to be channelled into abovementioned space 55, and therefore enable the cooling of floor 32 and of nozzle 33 to be optimised.

Figure 7:
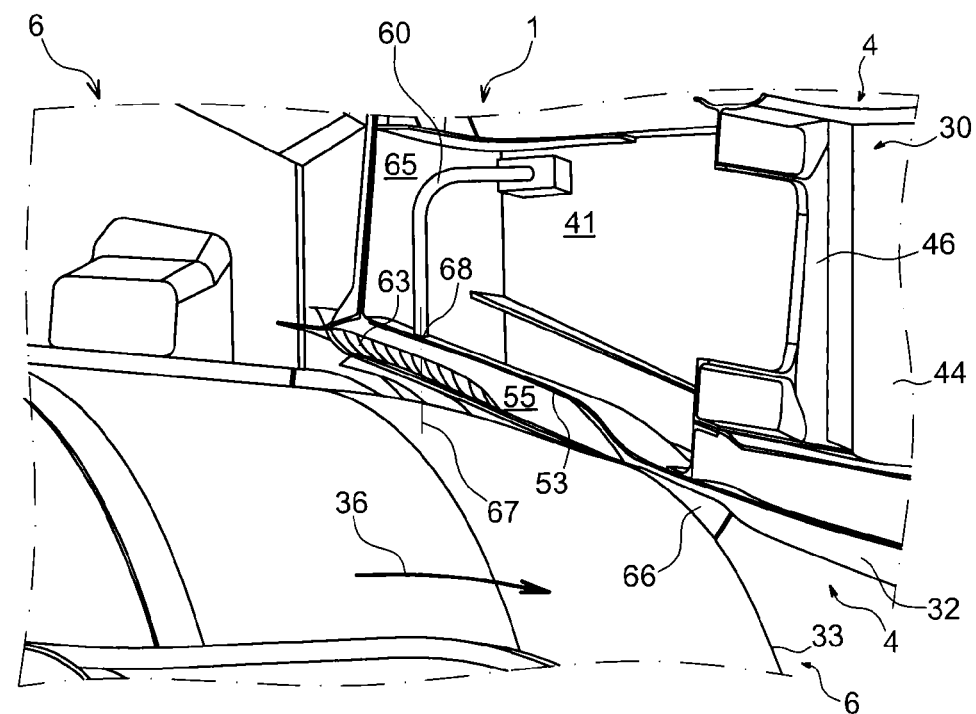
FIG. 7 is a partial perspective schematic view of a propulsion system for an aircraft, according to a second preferred embodiment of the present invention.

FIG. 7 illustrates a second preferred embodiment of the invention, which differs from the first embodiment described above in that inlets 58 are not positioned in bifurcation walls 56, but are formed in side panels 44 of aft aerodynamic fairing 30, and in that pipes 60 connected to these air inlets are housed within internal cavity 41 of this fairing, and emerge in abovementioned space 55 through apertures 68 of thermal protection floor 32, along air ejection axis 67, which is essentially orthogonal to this floor 32.

The invention claimed is:

1. A propulsion system for an aircraft, including a dual-flow turbojet and a mounting structure intended to mount said turbojet to the wing surface or to the fuselage of the aircraft, said mounting structure including an aft aerodynamic fairing including a thermal protection floor to protect said mounting structure from heat of a primary airstream channeled by an exhaust nozzle of said turbojet, said propulsion system comprising:

extraction means for extracting a cooling airstream from a secondary airstream of said turbojet, together with an air circulator fed by said extraction means, said air circulator having at least one outlet aperture emerging into a space defined by a gap between said thermal protection floor and said exhaust nozzle, the outlet aperture is located upstream from a trailing edge of the exhaust nozzle, wherein said extraction means include at least one air inlet connected to said air circulator and formed in an aerodynamic wall of said propulsion system, said aerodynamic wall being followed by said secondary airstream during operation, said aerodynamic wall extending longitudinally opposite another similar aerodynamic wall of said propulsion system, said aerodynamic wall delimiting with said another similar aerodynamic wall a cavity separated from said secondary airstream, wherein said aerodynamic fairing extends in an extension of a bifurcation formed of two bifurcation walls mutually connecting two annular nacelle cases respectively internally and externally delimiting an annular space for the secondary airstream to flow in said turbojet, and said aerodynamic walls being said bifurcation walls or side walls of said aft aerodynamic fairing.

2. A propulsion system according to claim 1, wherein said air circulator includes at least one pipe extending at least partly in said cavity.

3. A propulsion system according to claim 1, wherein said outlet aperture of said air circulator has an air ejection axis which is parallel to a front end portion of said thermal protection floor.

4. A propulsion system according to claim 1, wherein said outlet aperture of said air circulator traverses said thermal protection floor.

5. A propulsion system according to claim 1, including side sealing joints which laterally delimit said space between said thermal protection floor and said exhaust nozzle.

6. An aircraft including at east one propulsion system according to claim 1.

7. A method of cooling a thermal protection floor of an aft aerodynamic fairing of a structure for mounting a propulsion system according to claim 1, in which cooling air is extracted from the secondary airstream of the turbojet of said propulsion system by said extraction means, and is injected into said space comprised between said thermal protection floor and said exhaust nozzle of the turbojet by said air circulator.

8. A method according claim 7, wherein the cooling air is injected into said space in a direction parallel to said thermal protection floor so as to form a cooling film of air between said thermal protection floor and said primary airstream of the turbojet.

* * * * *